United States Patent
Triano et al.

(10) Patent No.: US 10,979,974 B2
(45) Date of Patent: Apr. 13, 2021

(54) SYSTEMS AND METHODS FOR REDUCING DEVICE POWER CONSUMPTION THROUGH USAGE CONTEXT OPERATION

(71) Applicants: AT&T Intellectual Property I, L.P., Atlanta, GA (US); AT&T Mobility II LLC, Atlanta, GA (US)

(72) Inventors: Stephen Francis Triano, Hillsborough, NJ (US); Haywood S. Peitzer, Randolph, NJ (US); James Gordon Beattie, Jr., Bergenfield, NJ (US)

(73) Assignees: AT&T Intellectual Property I, L.P., Atlanta, GA (US); AT&T Mobility II LLC, Atlanta, GA (US)

(*) Notice: Subject to any disclaimer, the term of this patent is extended or adjusted under 35 U.S.C. 154(b) by 110 days.

(21) Appl. No.: 15/380,694

(22) Filed: Dec. 15, 2016

(65) Prior Publication Data
US 2018/0176860 A1    Jun. 21, 2018

(51) Int. Cl.
| H04W 52/02 | (2009.01) |
| H04B 17/391 | (2015.01) |
| H04W 4/029 | (2018.01) |
| H04W 52/22 | (2009.01) |
| H04W 52/28 | (2009.01) |
| H04W 84/04 | (2009.01) |
| H04W 84/12 | (2009.01) |
| H04W 4/80 | (2018.01) |

(52) U.S. Cl.
CPC .... *H04W 52/0212* (2013.01); *H04B 17/3912* (2015.01); *H04W 4/029* (2018.02); *H04W 52/0203* (2013.01); *H04W 52/228* (2013.01); *H04W 52/28* (2013.01); *H04W 4/80* (2018.02); *H04W 52/287* (2013.01); *H04W 52/288* (2013.01); *H04W 84/042* (2013.01); *H04W 84/12* (2013.01); *Y02D 30/70* (2020.08)

(58) Field of Classification Search
CPC . H04W 52/00; H04W 52/02; H04W 52/0209; H04W 52/0212; H04W 52/0216; H04W 52/0222; H04W 52/0225; H04W 52/0232; H04W 52/0235; H04W 52/0241; H04W 52/0245; H04W 52/0248; H04W 52/0251; H04W 52/0254; H04W 52/0258
See application file for complete search history.

(56) References Cited

U.S. PATENT DOCUMENTS

| 7,408,506 B2 | 8/2008 | Miller |
| 8,103,291 B2 | 1/2012 | Rippon et al. |
| 8,315,646 B2 | 11/2012 | Karjalainen |

(Continued)

OTHER PUBLICATIONS

Michalevsky et al.; "PowerSpy: Location Tracking using Mobile Device Power Analysis"; 24th USENIX Security Symposium; 2015; 17 pages.

(Continued)

*Primary Examiner* — Ashley Shivers
(74) *Attorney, Agent, or Firm* — BakerHostetler

(57) ABSTRACT

Methods and apparatus to reduce device power consumption through usage context operation. An operational mode of a mobile device is detected. A usage context corresponding to the operational is determined. A device configuration supportive of the usage context is generated. The device configuration is implemented on the mobile device.

20 Claims, 10 Drawing Sheets

(56) References Cited

U.S. PATENT DOCUMENTS

| | | | |
|---|---|---|---|
| 8,499,245 B1* | 7/2013 | Froment | H04L 67/22 |
| | | | 715/734 |
| 8,804,680 B2 | 8/2014 | Schmidt et al. | |
| 8,848,585 B2 | 9/2014 | Chan et al. | |
| 8,958,854 B1 | 2/2015 | Morley et al. | |
| 9,055,475 B2 | 6/2015 | Lacatus et al. | |
| 9,060,318 B2 | 6/2015 | Nair et al. | |
| 9,319,993 B1* | 4/2016 | Urbanus | H04W 52/22 |
| 9,432,840 B2 | 8/2016 | Traynor et al. | |
| 2006/0019723 A1* | 1/2006 | Vorenkamp | H04W 52/0258 |
| | | | 455/574 |
| 2008/0224825 A1* | 9/2008 | Nystrom | G06K 7/0008 |
| | | | 340/10.1 |
| 2009/0163226 A1 | 6/2009 | Karkaria et al. | |
| 2009/0186584 A1* | 7/2009 | Lambrecht | H04W 52/241 |
| | | | 455/67.11 |
| 2010/0100716 A1* | 4/2010 | Scott | H04L 12/12 |
| | | | 713/1 |
| 2011/0130150 A1* | 6/2011 | Kolding | H04W 52/0258 |
| | | | 455/453 |
| 2013/0326250 A1* | 12/2013 | Sullivan | G06F 1/3206 |
| | | | 713/323 |
| 2014/0176306 A1* | 6/2014 | Lee | G06K 7/10237 |
| | | | 340/10.1 |
| 2014/0365787 A1* | 12/2014 | Sagar | G06F 1/3203 |
| | | | 713/300 |
| 2015/0043410 A1 | 2/2015 | Chaturvedi et al. | |
| 2016/0073352 A1 | 3/2016 | Baron et al. | |
| 2016/0088570 A1 | 3/2016 | Cui et al. | |
| 2016/0357354 A1* | 12/2016 | Chen | G04G 13/02 |
| 2017/0055221 A1* | 2/2017 | Hou | H04W 52/0258 |
| 2017/0102700 A1* | 4/2017 | Kozak | B60W 30/00 |
| 2018/0088795 A1* | 3/2018 | van Os | G06F 3/04883 |

OTHER PUBLICATIONS

Pering et al.; "CoolSpots: Reducing the Power Consumption of Wireless Mobile Devices with Multiple Radio Interfaces"; Proceedings of the 4th Int'l Conf. on Mobile systems, applications and services; 2006; p. 220-232.

* cited by examiner

SYSTEMS AND METHODS FOR REDUCING DEVICE POWER CONSUMPTION THROUGH USAGE CONTEXT OPERATION

TECHNICAL FIELD

The technical field relates generally to reducing power consumption in communication networks and more particularly to reducing power consumption in mobile devices used with communication networks.

BACKGROUND

Mobile devices have a limited amount of energy storage (e.g. battery) capacity. This limitation conflicts with the ever increasing amount of functionality that users expect mobile devices to provide. Increases in functionality typically correspond to increases in utilization of system resources which corresponds to reduced battery life. For instance, at a given time, a mobile device may utilize GPS chip to track its location, a Wi-Fi chip to connect to a Wi-Fi network, a Bluetooth chip to for short field communication, and a LTE/3G chip for wide area communication. Not to mention, a myriad of other system resources, such as memory, ASICs, etc. that are used to support these functions. A problem exists in that each of these resources draws power and thereby reduces battery life. Therefore, what is needed is an approach to reduce the amount of power that these resources individually and collectively consume.

SUMMARY

The disclosed systems, methods, and apparatuses that allow for reducing device power consumption through usage context operation.

In one embodiment, a method is provided. An operational mode of a mobile device operating on a network is detected. A usage context is determined through use of the operational mode. A power conservation model is associated with the usage context. The device is caused to operate in accordance with the power conservation model.

In one embodiment, a system is provided with a processor and memory coupled to the processor, the memory includes executable instructions that cause the processor to effectuate operations. In one embodiment, operations include detection of an operational mode of a mobile device operating on a network. A usage context is determined corresponding to the operational mode. A device configuration associated with the usage context is created. The device configuration on the mobile device is implemented.

In one embodiment, a method is provided. An operational mode of a mobile device is detected. A usage context corresponding to the operational is determined. A device configuration supportive of the usage context is generated. The device configuration is implemented on the mobile device.

BRIEF DESCRIPTION OF THE DRAWINGS

Aspects of the herein described systems and methods are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

Figure 1:
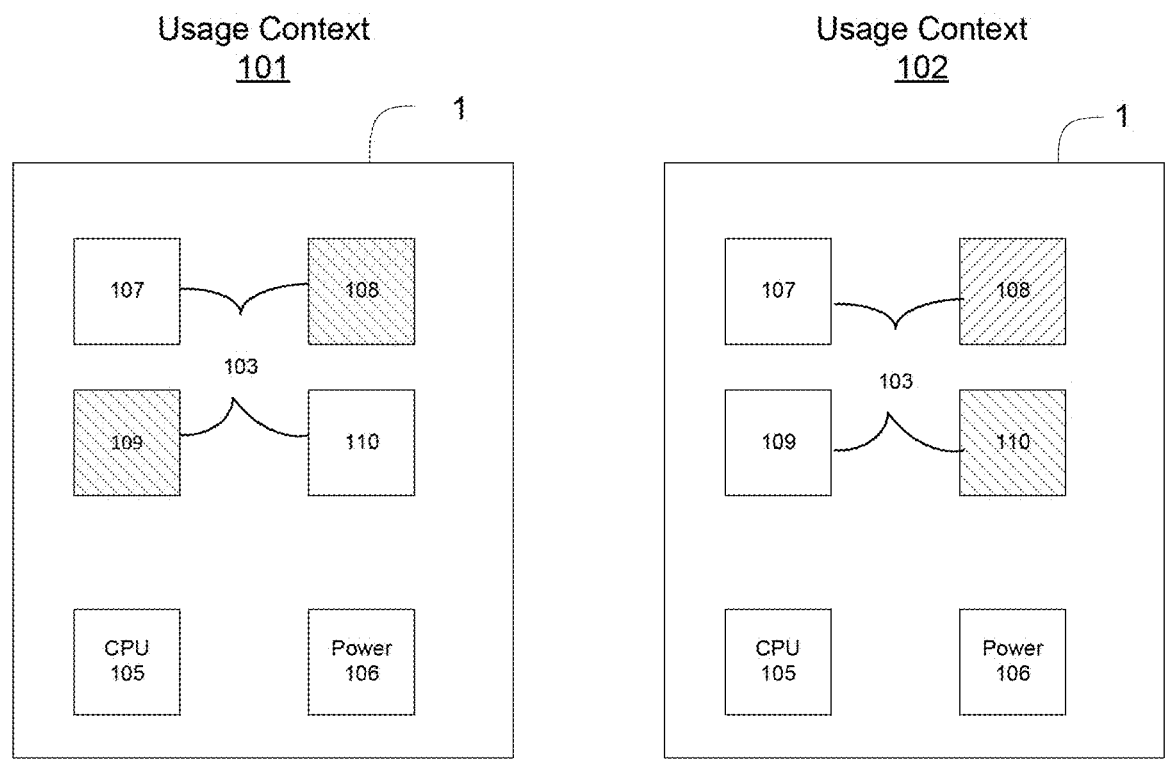
FIG. 1 depicts a high level example of a mobile communications device operating in a plurality of behavioral contexts.

Referring to FIG. 1, at least one instance of a device 1 is shown operating in accordance with a first usage context 101 and operating within a second usage context 102. In one example, device 1 is a mobile communications device, which is meant to operate in conjunction with one or more networks and communicate with other devices residing on such networks.

In one embodiment, a usage context 101, 102 refers to one or more of the circumstances that form the setting within which device 1 operates in a given setting. For instance, a usage context may include, but is not limited to, the location in which device 1 is located; the time period in which device 1 is operated; the system resources utilized by the device 1; the activity level of system resources utilized by device 1; the interaction of a user with device 1; user utilization of system resources of device 1; the interaction of device 1 with its physical environment; the physical movement of device 1; the interaction of device 1 with one or more networks and the corresponding utilization of resources; and possible combinations of the preceding examples.

Specific examples of the preceding exemplary circumstances may include, but are not limited to, the device's: operating mode (high power, low power); setting (time, date, location); movement patterns; behavior patterns (gaining, media consumption, business processes); network connectivity and/or utilization; and/or proximity and connectivity to other devices.

It should be noted that the preceding circumstances are provided to be illustrative, not exhaustive. Furthermore, a usage context 101, 102 may comprise a single circumstance and/or various subgroups of circumstances. Lastly, two usage contexts 101, 102 are provided for illustrative purposes, but it should be understood that the number of usage contexts 101,102 is fluid and a function of the number of applicable circumstances. It should be understood that a usage context 101,102 may be pre-configured given a particular set of circumstances or may be created dynamically thorough mechanisms, such as processing rules, artificial intelligence, and/or machine learning.

Referring further to FIG. 1, device 1 in one example comprises a plurality of hardware and/or software components 103, referred to as "device components 103". Device components 103 are the hardware and/or software components that cause device 1 to perform various functionality. Examples of device components include, but are not limited to, radio devices, memory devices, processing devices, display devices, and/or user interface devices. Network device 300 (FIG. 3) and user equipment 414 (FIG. 4) provide more detailed examples of device 101. It should be understood that the functions of such hardware and software components may be combined and/or divided as circumstances and design requirements dictate.

Referring further to FIG. 1, device 1, in one example, may have a central processor component 105 and a power supply 106 in addition to device components 103. Central processor component 105 operates to execute instructions, control device components 103, control the transfer of data between device components 103 and external devices. Power supply 106 supplies power to device 1, and, in one example, may be a battery. However, power supply 106 may take other forms, such as electric, solar, and the like.

Referring further to FIG. 1, as device 1 is utilized by a user, the operation of device 1 may change. For instance, user may actuate device 1 when it is in a resting or standby mode and begin to utilize device 1 for a specific purpose. An example would be a user actuating device 1 to play a game or to consume media. Another example would be a user initially using device 1 solely in a voice communication using a cellular connection, but then changing to a more data intensive form of communication, such as video chat or transfer of large media files. Another example would be a user changing from a setting in which a plurality of connectivity options were present, e.g. Wi-Fi, Bluetooth endpoints, etc., to a setting with less or more connectivity options. Another example may be that the setting or usage of device 1 remains the same, but the time of day changes. For instance, a user may require device 1 to operate as a passive receiver in the middle of the night, but may require device 1 to engage in much more robust operation after the day begins. As the user changes how the user interacts with the device, the operation of the device changes. For instance, certain system resources may be engaged more than others. This change in operation correlates to a change in the usage context of the device.

Another example may be that device 1 anticipates, through machine learning, the user's intended operation of device and the changes in operation that occur over time. For instance, device 1 may recognize that a user performs a certain activity every weekday, such as driving to work. During this period, the user will have access to GPS in the user's car and thus will not need GPS on the user's device 1. In addition, the user may have a Wi-Fi connection and therefore could use Wi-Fi to communicate with other users. In another example, the user's calendar program, residing on device 1 or elsewhere (e.g. a network server), may have entries indicating a particular use. For instance, if the user has a calendar entry indicating a conference call at a particular time, then it is unlikely, during such time period, that the user will be consuming media or playing a game. In another example, the user's calendar entry may indicate that the user will be in a location where certain types of activities are unavailable or prohibited; accordingly, the user would have no need for device 1 to support operations enabling such activities during the particular time period covered by the calendar entry. Accordingly, in the above examples, device 1 may anticipate that operation of the device, and the corresponding usage context, will change over time.

In another example, the user may set device 1 to a particular operation and ask device 1 to listen for changes in device operation. For instance, the user may set device 1 to a do not disturb mode, except for receipt of texts or voicemails. During this period, the device may listen for communications on a low power channel, but ignore, or not download or notify user of, any communication except for texts or voicemails. In another example, the user may be in an area of low bandwidth and instruct device 1 to ignore all communications including large data files, such as photographs. During such period, the device 1 may listen for all communications, but ignore or not attempt to download, large files, such as pictures. When the user leaves the area of low bandwidth, the user may instruct device to accept high bandwidth communications. Accordingly, the operation, and corresponding usage context, will change over time.

It should be noted that the preceding examples highlight certain operational changes that may occur while a user, either actively or passively, operate a device. Such changes may occur in an automated fashion or through user interaction through a user interface. The device 1 may identify these operational changes as they occur or may anticipate the operation changes through machine learning or artificial intelligence. Regardless, as device 1 changes operation, device 1 may identify that a behavioral or usage context has changed and therefore to preserve battery life the consumption of system resources, such as device components 103, should change.

FIG. 1 depicts a change in usage context by displaying device as it transitions from usage context 101 to usage context 102. Based on the preceding description, it should be evident that there are many different usage contexts within the scope of this description, and usage context 101 and usage context 102 are provided for illustrative purposes only.

Furthermore, it should be noted that the preceding example of a change in operation or usage context was described as happening within or by device 1. However, it should be understood, that such context could be determined by a network element not residing on device 1. For instance, a mobile service provider or some other network provider could identify how device 1 is operating and determine its usage context. The provider could then issue notifications and/or commands to device 1 instructing it to alter its operation based on usage context.

Referring further to FIG. 1, as device 1 changes from usage context 101 to usage context 102, certain device components 103 may or may not need to be utilized in the same way. For example, certain device components 103 that are active in usage context 101 may not be needed in usage context 102. Therefore, such device components 103 may be deactivated or powered off. In another example, certain device components that are not active, and powered off in usage context 101, may be activated and powered on in usage context 102. In another example, certain device components 103 that require full power in usage context 101 may require less power in usage context 102, and vice versa. For instance, if usage context 101 did not require access to high bandwidth data communication, then the bandwidth setting on device component 103 supporting broadband communication could be set to a lower bandwidth. In another example, a power cycle setting of one or more device components 103 could be changed based on usage context. For instance, during the middle of the night, the power cycle interval of components 103 may be increased.

Referring further to FIG. 1, for illustrative purposes, the following is depicted: As device 1 change from usage context 101 to usage context 102, the operation (and therefore power requirements) of certain device components 103 are changed. Device component 107 stays the same from usage context 101 to usage context 102, but device component 108 transitions from fully on to a reduced power setting. Device component 109 transitions from reduced power to fully off. Device component 110 transitions from fully off to fully on.

It should be noted that the depiction in FIG. 1 is provided for illustrative purposes only and not to limit the disclosure to the embodiment shown therein. The principles described herein are scalable to a greater or lesser number of device components 103 and usage contexts. Further, at least on instance of network device 1 is shown to describe illustrative operations, but many such devices may be operating throughout one or more networks.

Figure 2:
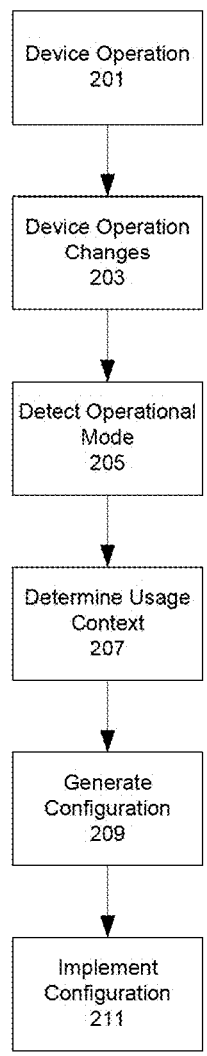
FIG. 2 depicts a flowchart of one example of a method for operating the device of FIG. 1.

Referring now to FIG. 2, an exemplary description of one embodiment of a method 200 of operation for device 1 is shown for illustrative purposes. In step 201, device 1 is operated in a certain manner which has a particular usage context. During operation in accordance with such usage context, device components 103 may be turned on and drawing full power, may be turned off and drawing no power, or may be operating in a reduced power state, such as a low bandwidth mode. In step 203, the device operation changes.

In step 205, central processor component 105 detects a change in the operational mode of device 1. Central processor component 105 may detect the change in the operational mode through mechanisms such as monitoring the interaction of device components 103 with one or more networks, with the surrounding environment, with a user, and the like. For instance, if an activity level of a particular device component 103, such as a Wi-Fi chip, changes from standby to active and begins exchanging data, then device 1 is in a Wi-Fi enabled area. In another instance, an accelerometer may indicate that a device 1 is moving at a high rate of speed.

In another example, central processor component 105 may monitor device components 103 and correlate the activity of device components with certain other operation. For instance, the user may employ device 1 a certain way during certain time periods or in certain environments. For instance, the user may play a game when in a certain location. Such a game may require Wi-Fi and GPS. Therefore, central processor component 105 may anticipate a change of operation, rather than detect a change in operation.

In step 207, upon detecting the change of operation or upon anticipating a change of operation, central processor unit 105 determines a usage or behavioral context for device 1. Such a usage context, in one example, may be determined through use of rules, which identify the desired or actual behavioral interaction of device 1 with its environment, with a network, and/or with a user. For instance, if device 1 is moving at high speed, during a weekday, at 7 AM, then central processor unit may identify that the usage context is the user's "morning commute". If the device 1 is being operated at 10 PM, while in the user's home, to view media files over Wi-Fi, then the central processor unit 105 may determine that the usage context is "home entertainment". If the device 1 is being operated to make voice calls in a geographic area having no broadband capacity, then the central processor unit 105 may determine that the usage context is "cellular telephone". In another example, the usage context may be determined by employing machine learning to detect patterns in device 1 and/or user behavior, which identify the particular context. It should be noted that the preceding usage contexts are provided for illustrative purposes only and not to limit the disclosure to any particular number of usage contexts.

In step 209, upon determining the usage context, central processor unit 105 will create or generate a configuration of device components 103 to support the usage context. As noted with reference to FIG. 1, the configuration will depend on the components that are necessary to support a particular context. For instance, if Wi-Fi is needed, then a Wi-Fi component will be enabled; if GPS is needed, then a GPS component will be needed; if these components are not needed, then they will be disabled. In another example, certain components may be operated in a low power mode while others are enabled or disabled. The configuration may be generated by processor unit in accordance with rules that set certain device components to certain operating modes corresponding to particular usage context or may be generated in accordance with machine learning through detecting certain component utilization during certain usage patterns within a usage context.

In step 211, central processor unit 105 implements the configuration by setting the device components 103 to the correct mode of operation for the usage context.

Referring to FIGS. 3-10, a description of exemplary embodiments of network device 1 and an exemplary network environment for network device 1 will now be provided for illustrative purposes.

Figure 3:
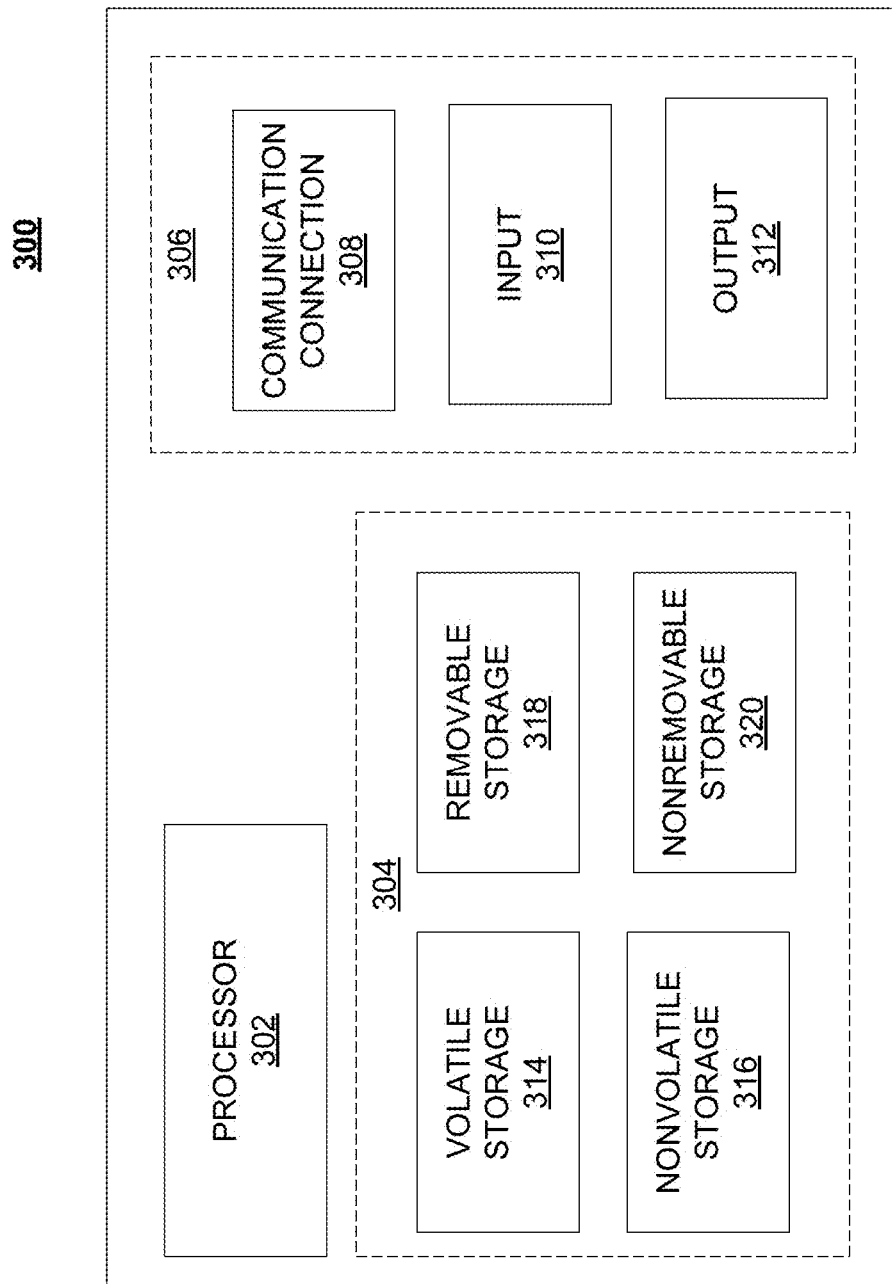
FIG. 3 is a schematic of an exemplary network device employable as the communication device of FIG. 1.

FIG. 3 is a block diagram of network device 300 that may be connected to or comprise a component of cellular network 112 or wireless network 114. Network device 300 may comprise hardware or a combination of hardware and software. The functionality to facilitate telecommunications via a telecommunications network may reside in one or combinations of network devices 300. Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 3) to allow communications therebetween. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a nonremovable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 4:
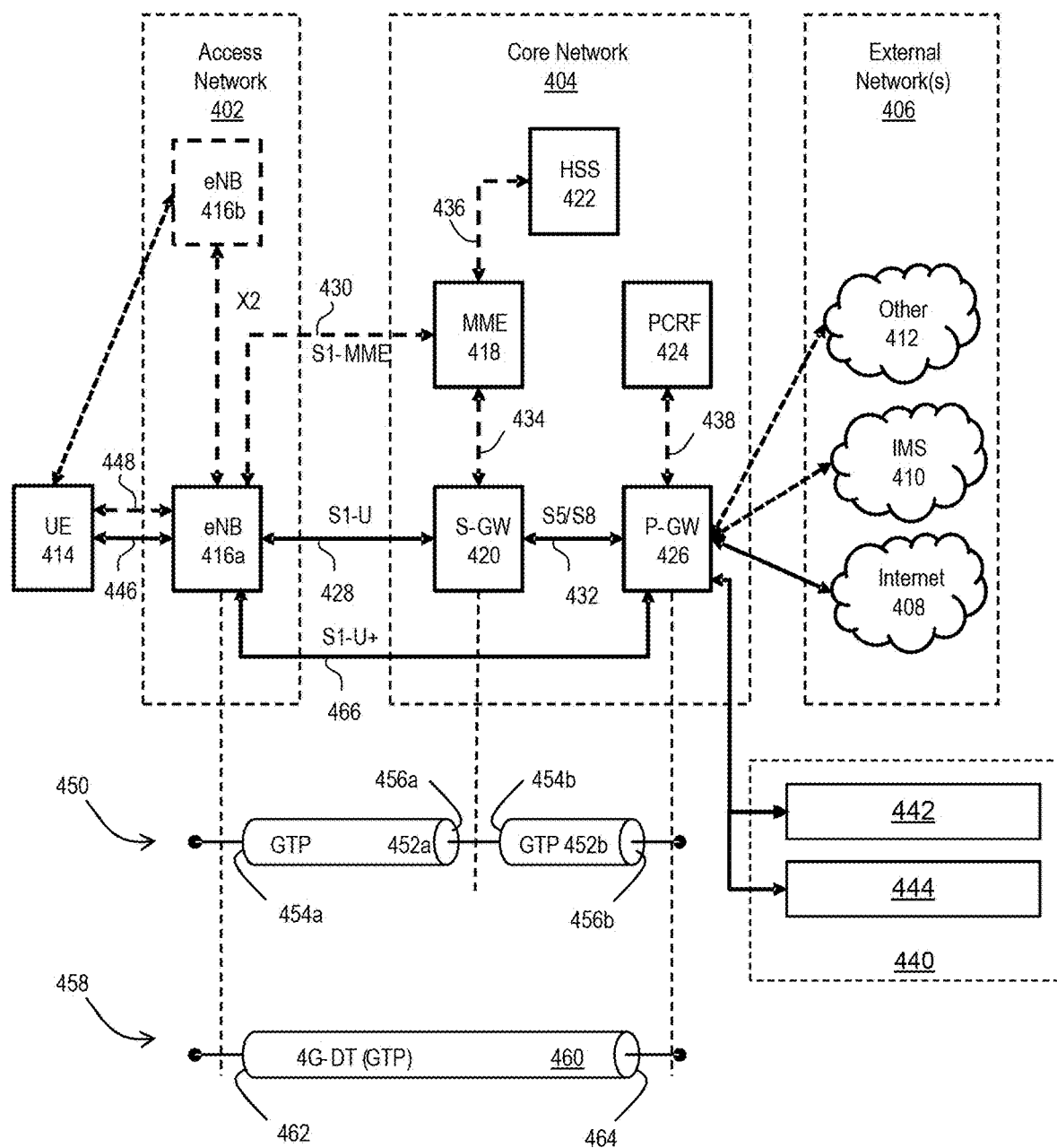
FIG. 4 depicts an exemplary communication system that provides wireless telecommunication services over wireless communication networks.

FIG. 4 illustrates a functional block diagram depicting one example of an LTE-EPS network architecture 400 related to the current disclosure. In particular, the network architecture 400 disclosed herein is referred to as a modified LTE-EPS architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. In one embodiment, the LTE-EPS network architecture 400 includes an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416a, 416b. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416a.

HSS 422 can manage subscription-related information for a user of UE 414. For example, tHSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416a and PGW 426. Notably, S1-U+ path/interface does not include SGW 420, a node that is otherwise instrumental in configuring and/or managing packet forwarding between eNB 416a and one or more external networks 406 by way of PGW 426. As disclosed herein, the S1-U+ path/interface facilitates autonomous learning of peer transport layer addresses by one or more of the network nodes to facilitate a self configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 4. In other words, either or both of access network 402 and the core network 404 can include additional network elements that are not shown, such as various routers, switches and controllers. In addition, although FIG. 4 illustrates only a single one of each of the various network elements, it should be noted that access network 402 and core network 404 can include any number of the various network elements. For example, core network 404 can include a pool (i.e., more than one) of MMES 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 4. For example, a first signaling portion (e.g., a signaling radio bearer 448) between UE 414 and eNB 416a, and a second signaling portion (e.g., S1 signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 400, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. That is, SGW 420 can serve a relay function, by relaying packets between two tunnel endpoints 416a, 426. In other scenarios, direct tunneling solution 458 can forward user data packets between eNB 416a and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual bases. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 5:
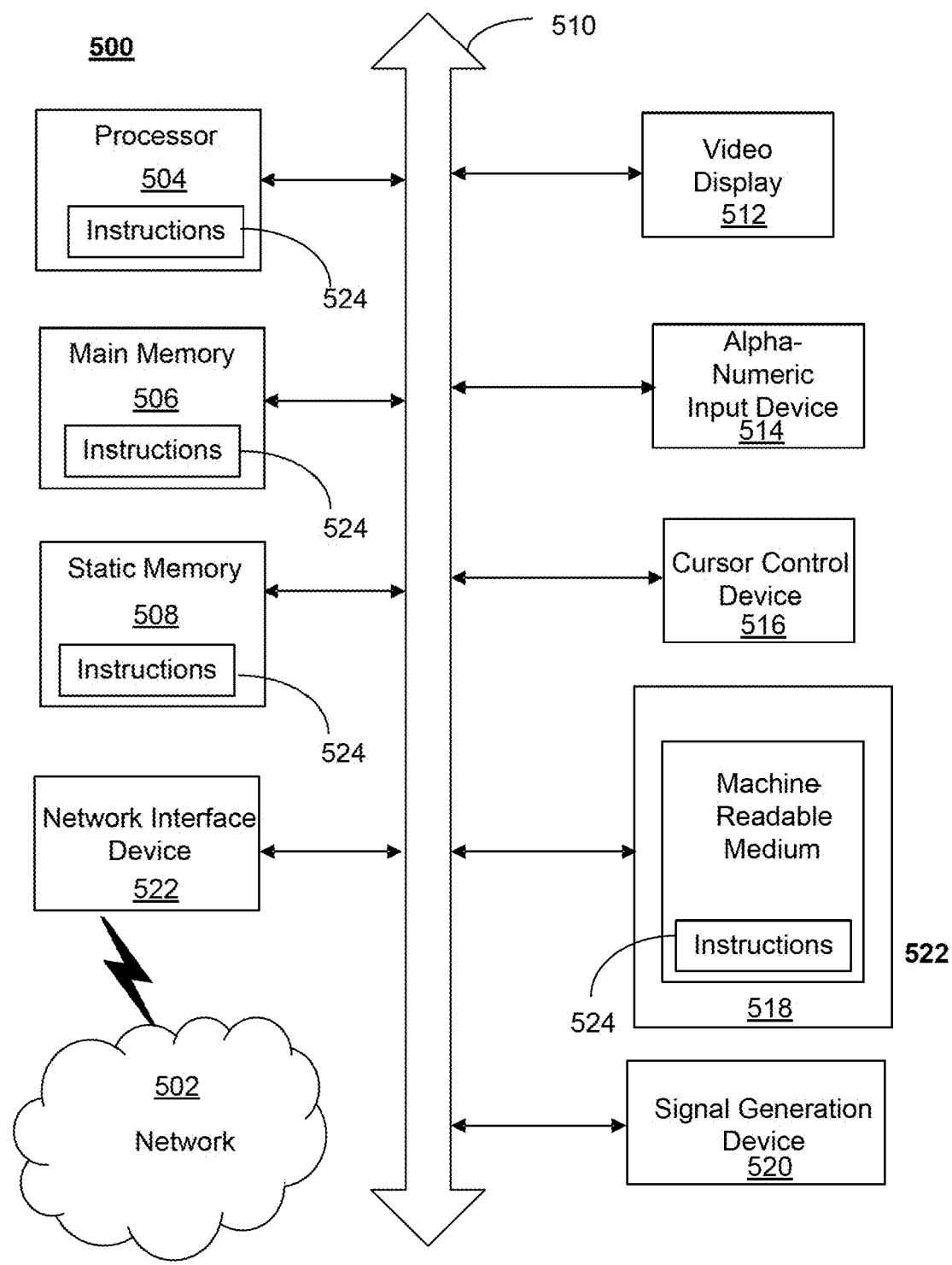
FIG. 5 depicts an exemplary communication system that provides wireless telecommunication services over wireless communication networks.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 302, UE 414, eNB 416, MME 418, SGW 420, HSS 422, PCRF 424, PGW 426 and other devices of FIGS. 1, 2, and 4. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 6:
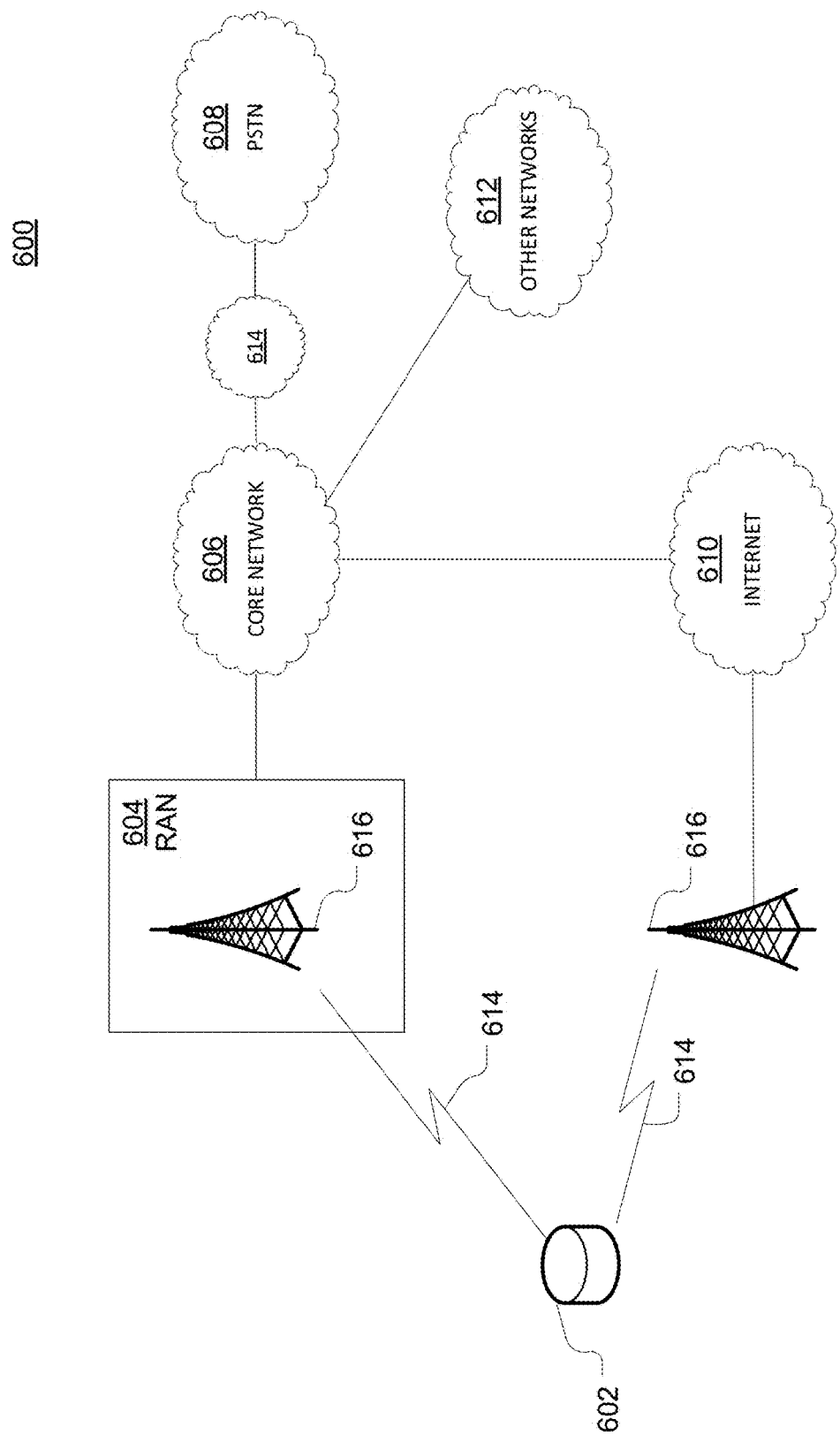
FIG. 6 is a diagram of an exemplary telecommunications system in which the disclosed methods and processes may be implemented.

As shown in FIG. 6, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise drone 102, a mobile device, network device 300, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 6, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 6, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 7:
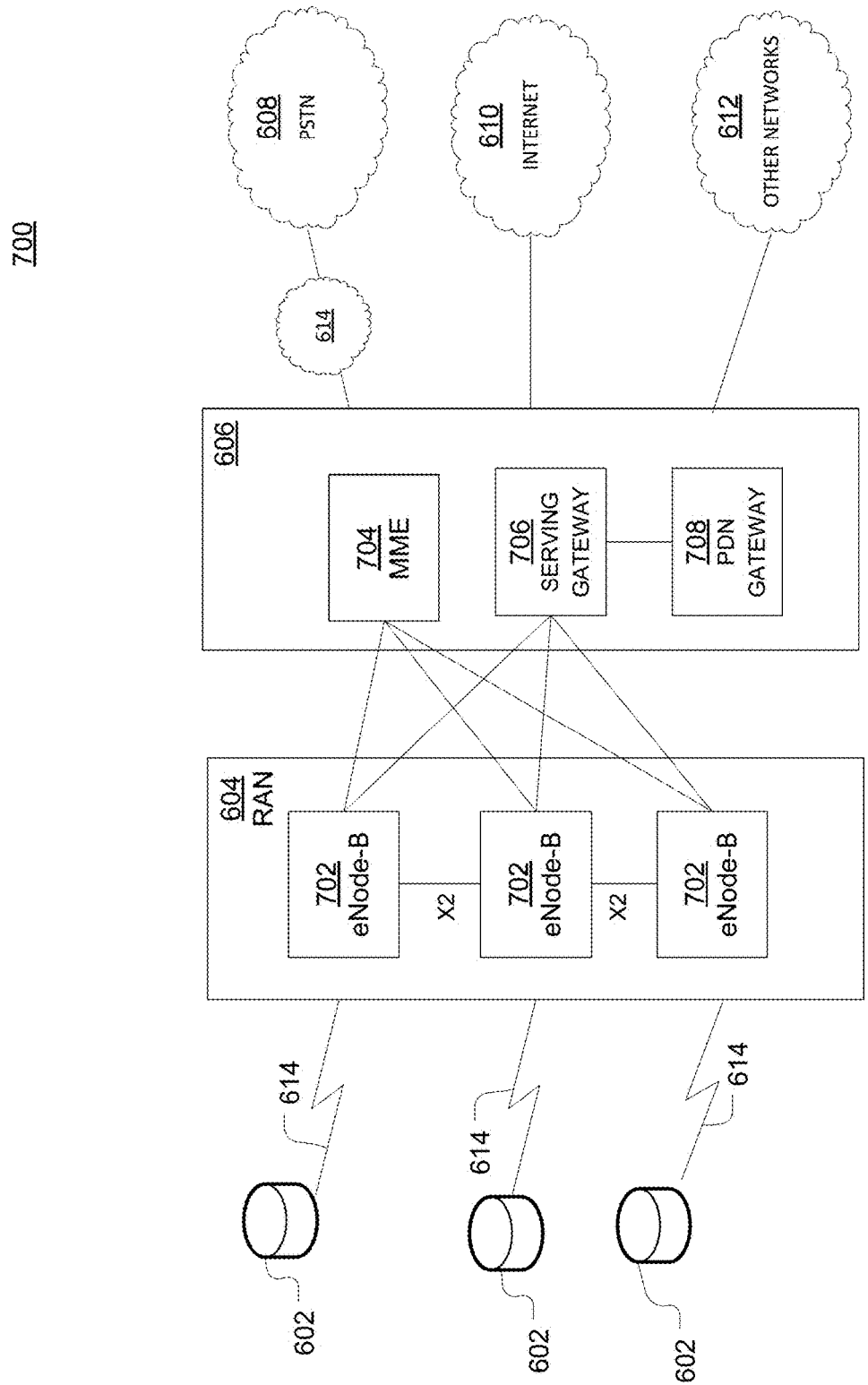
FIG. 7 is an example system diagram of a radio access network and a core network.

FIG. 7 is an example system 400 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell (not shown) and may be configured to handle radio resource management decisions, handover decisions, scheduling of users in the uplink or downlink, or the like. As shown in FIG. 7 eNode-Bs 702 may communicate with one another over an X2 interface.

Core network 606 shown in FIG. 7 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers.

Figure 8:
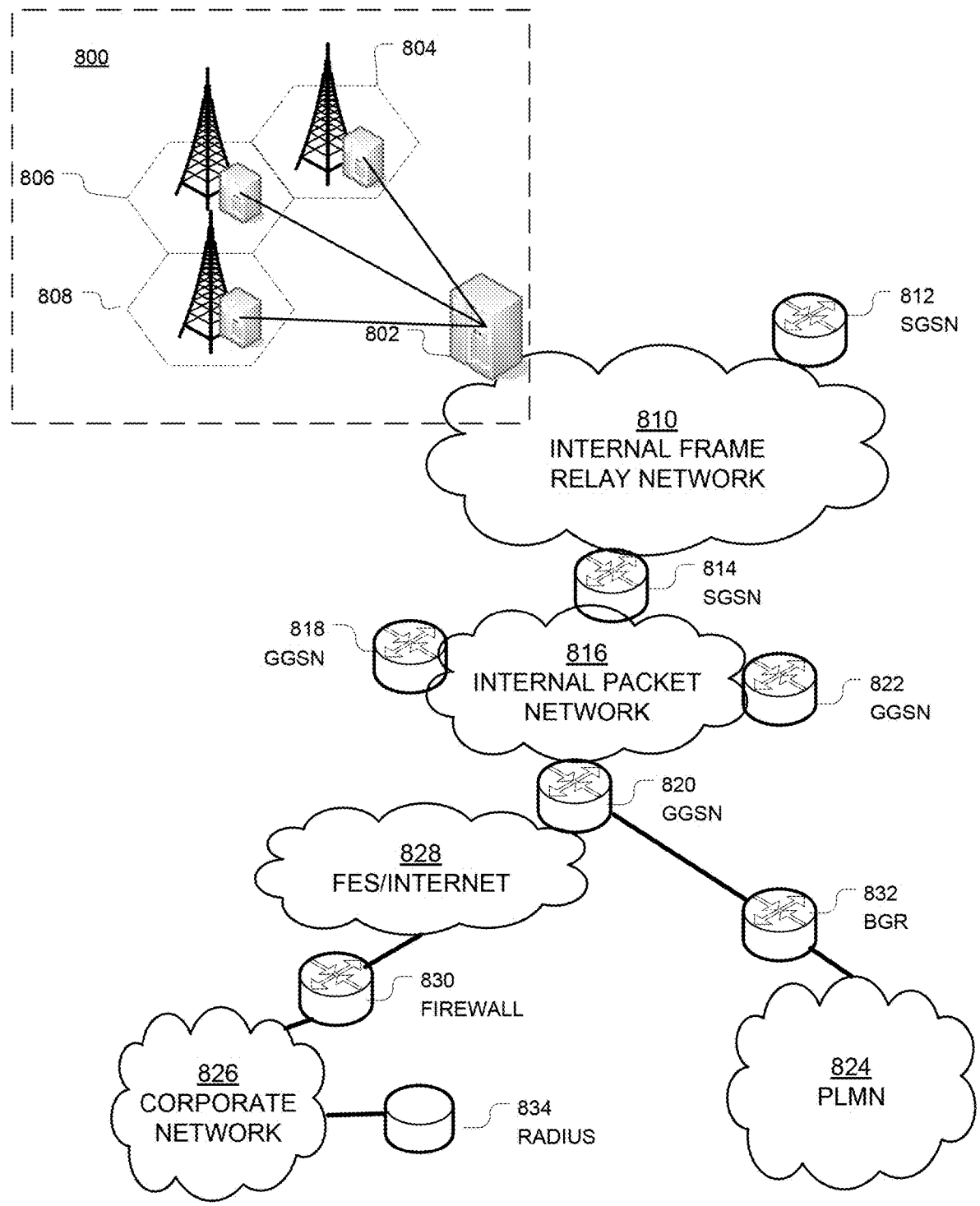
FIG. 8 depicts an overall block diagram of an example packet-based mobile cellular network environment, such as a general packet radio service (GPRS) network.

FIG. 8 depicts an overall block diagram of an example packet-based mobile cellular network environment, such as a GPRS network as described herein. In the example packet-based mobile cellular network environment shown in FIG. 8, there are a plurality of base station subsystems (BSS) 800 (only one is shown), each of which comprises a base station controller (BSC) 802 serving a plurality of BTSs, such as BTSs 804, 806, 808. BTSs 804, 806, 808 are the access points where users of packet-based mobile devices become connected to the wireless network. In example fashion, the packet traffic originating from mobile devices is transported via an over-the-air interface to BTS 808, and from BTS 808 to BSC 802. Base station subsystems, such as BSS 800, are a part of internal frame relay network 810 that can include a service GPRS support nodes (SGSN), such as SGSN 812 or SGSN 814. Each SGSN 812, 814 is connected to an internal packet network 816 through which SGSN 812, 814 can route data packets to or from a plurality of gateway GPRS support nodes (GGSN) 818, 820, 822. As illustrated, SGSN 814 and GGSNs 818, 820, 822 are part of internal packet network 816. GGSNs 818, 820, 822 mainly provide an interface to external IP networks such as PLMN 824, corporate intranets/internets 826, or Fixed-End System (FES) or the public Internet 828. As illustrated, subscriber corporate network 826 may be connected to GGSN 820 via a firewall 830. PLMN 824 may be connected to GGSN 820 via a boarder gateway router (BGR) 832. A Remote Authentication Dial-In User Service (RADIUS) server 834 may be used for caller authentication when a user calls corporate network 826.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 9:
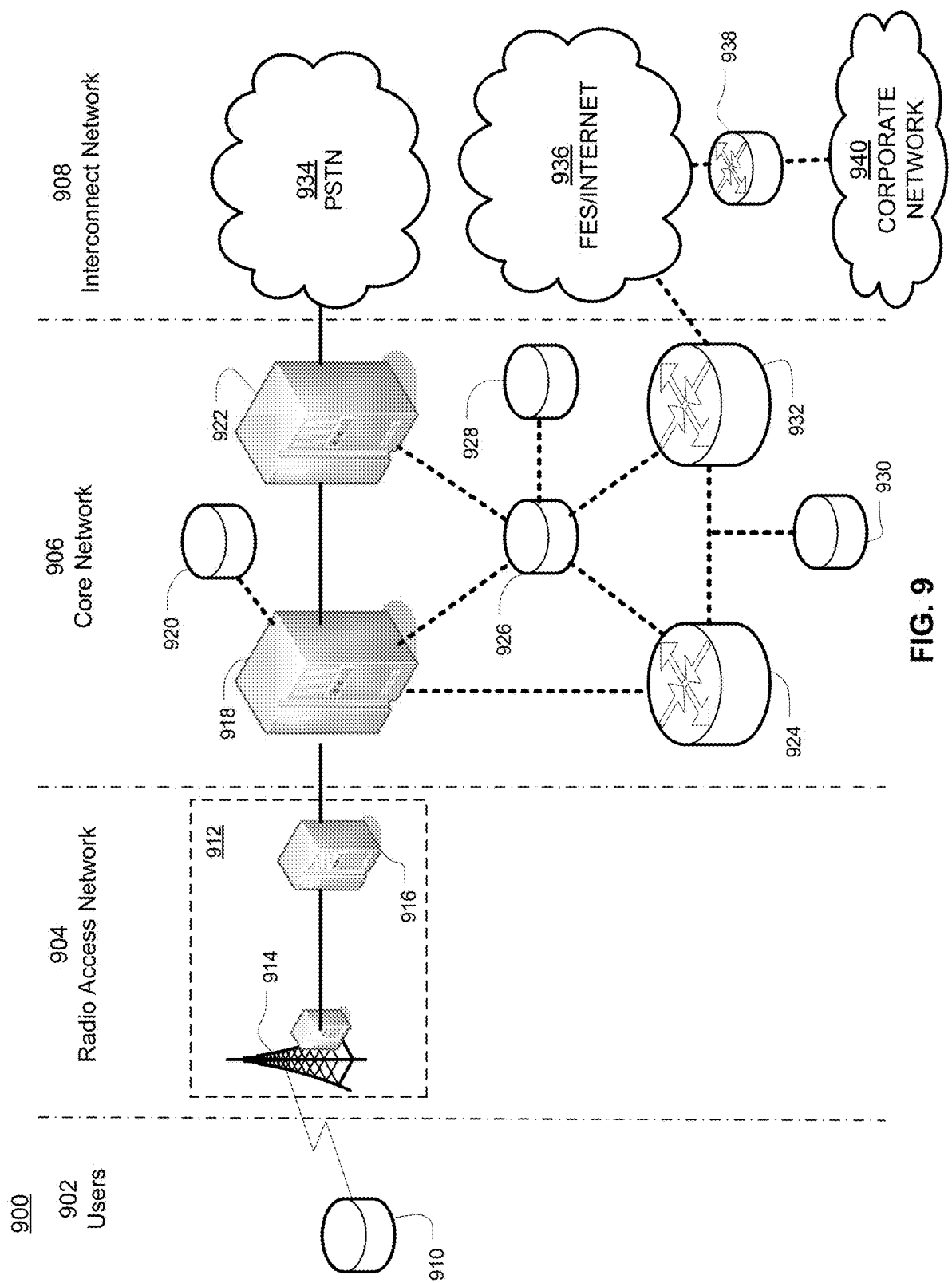
FIG. 9 illustrates an exemplary architecture of a GPRS network.

FIG. 9 illustrates an architecture of a typical GPRS network 900 as described herein. The architecture depicted in FIG. 9 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 9. In an example, device 910 comprises a communications device (e.g., first network device 1, second network device 2, mobile positioning center 116, network device 300, any of detected devices 500, second device 508, access device 604, access device 606, access device 608, access device 610 or the like, or any combination thereof). Radio access network 904 comprises a plurality of BSSs such as BSS 912, which includes a BTS 914 and a BSC 916. Core network 906 may include a host of various network elements. As illustrated in FIG. 9, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 9, interconnect network 908 comprises a PSTN 934, an FES/Internet 936, a firewall 1038, or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

HLR 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 9, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 1038, to reach corporate network 940.

Figure 10:
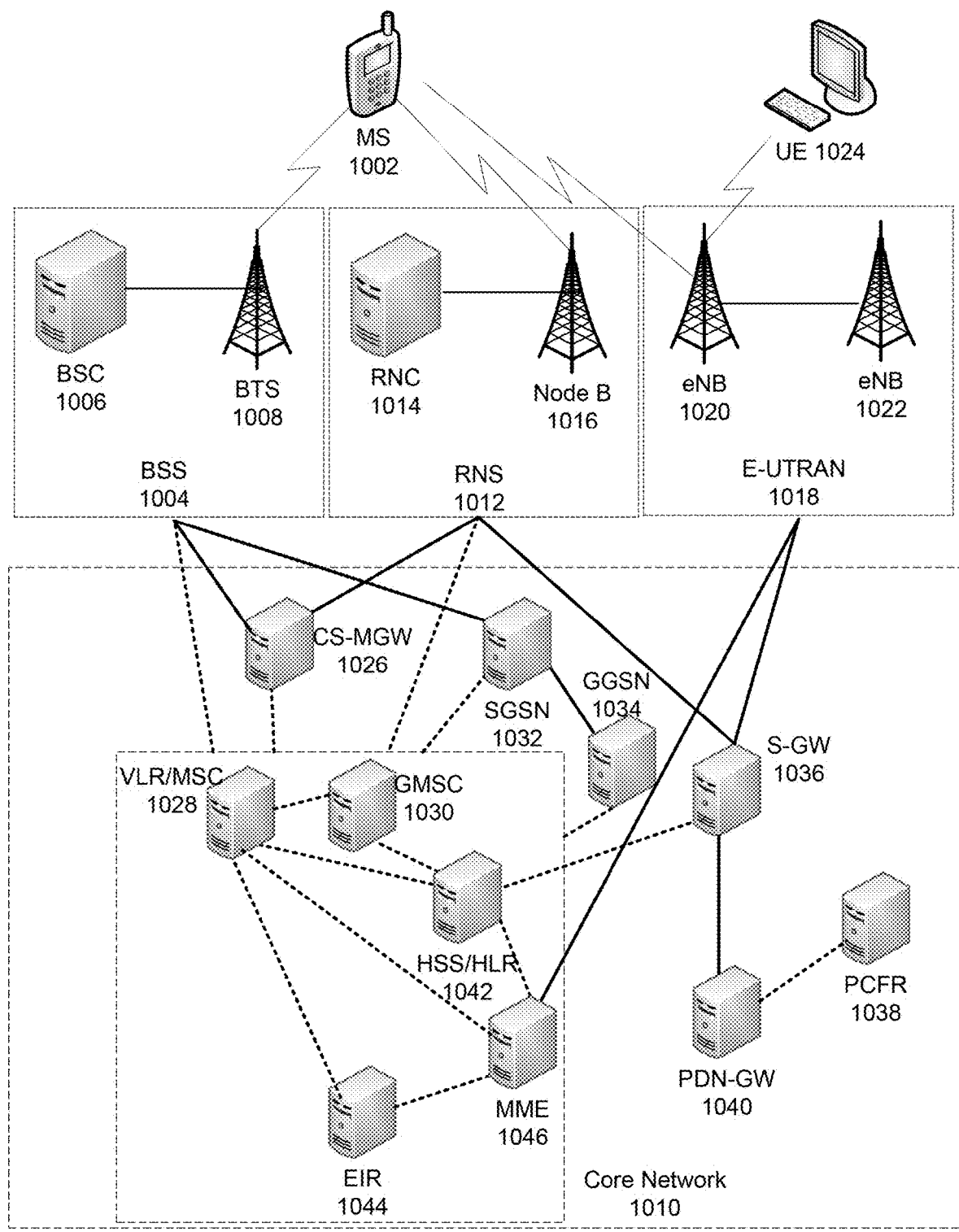
FIG. 10 is a block diagram of an exemplary public land mobile network (PLMN)

FIG. 10 illustrates a PLMN block diagram view of an example architecture that may be replaced by a telecommunications system. In FIG. 10, solid lines may represent user traffic signals, and dashed lines may represent support signaling. MS 1002 is the physical equipment used by the PLMN subscriber. For example, drone 102, network device 300, the like, or any combination thereof may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile device, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically MS 1002 may communicate with any or all of BSS 1004, RNS 1012, or E-UTRAN 1018. In a illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched MGW function (CS-MGW) 1026 is part of core network 1010, and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location information such as, but not limited to, GGSN address for each GGSN 1034 where an active PDP exists. GGSN 1034 may implement a location register function to store subscriber data it receives from SGSN 1032 such as subscription or location information.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS 1042 is a database for user information and stores subscription data regarding MS 1002 or UE 1024 for handling calls or data sessions. Networks may contain one HSS 1042 or more if additional resources are required. Example data stored by HSS 1042 include, but is not limited to, user identification, numbering or addressing information, security information, or location information. HSS 1042 may also provide call or session establishment procedures in both the PS and CS domains.

VLR/MSC Server 1028 provides user location functionality. When MS 1002 enters a new network location, it begins a registration procedure. A MSC server for that location transfers the location information to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. GMSC server 1030 may serve as a connection to alternate GMSC servers for other MSs in larger networks.

EIR 1044 is a logical element which may store the IMEI for MS 1002. User equipment may be classified as either "white listed" or "black listed" depending on its status in the network. If MS 1002 is stolen and put to use by an unauthorized user, it may be registered as "black listed" in EIR 1044, preventing its use on the network. A MME 1046 is a control node which may track MS 1002 or UE 1024 if the devices are idle. Additional functionality may include the ability of MIME 1046 to contact idle MS 1002 or UE 1024 if retransmission of a previous session is required.

While examples of a telecommunications have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

What is claimed:

1. A method comprising:
    utilizing machine learning to analyze component usage of a mobile device;
    predicting a future usage context of the mobile device based on utilization of the machine learning, wherein the future usage context relates to usage of one or more components of the mobile device when the mobile device is being actively used by a user;
    generating a custom power configuration for the mobile device based on the future usage context;
    utilizing a policy function component operating on the network to determine whether implementation of the custom power configuration on the mobile device would be consistent with Quality of Service (QoS) packet transfer requirements set by a network-operator; and
    implementing the custom power configuration on the mobile device by transmitting a message to the mobile device to operate in accordance with the power configuration if it is determined that implementation of the power configuration on the mobile device would be consistent with the QoS packet transfer requirements.

2. The method of claim 1, further comprising analyzing historical usage of the mobile device.

3. The method of claim 2, wherein analyzing historical usage data further comprises:
    comparing the historical usage to current usage.

4. The method of claim 2, wherein analyzing historical usage data further comprises analyzing a-calendar program residing on the mobile device.

5. The method of claim 1, wherein generating the custom power configuration comprises:
    selecting at least one of a hardware component and a software component of the mobile device to operate in a power off mode.

6. The method of claim 1, wherein generating the custom power configuration comprises:
    selecting a communication transceiver residing on the mobile device; and
    reducing a bandwidth setting of the communication transceiver.

7. The method of claim 1, wherein generating the custom power configuration comprises:

reducing a power cycle at which at least one physical component of the mobile device operates.

8. An apparatus comprising: a processor; and
memory coupled to the processor, the memory comprising executable instructions that cause the processor to effectuate operations comprising:
  utilizing machine learning to analyze component usage of a mobile device;
  predicting a future usage context of the mobile device based on utilization of the machine learning, wherein the future usage context relates to usage of one or more components of the mobile device when the mobile device is being actively used by a user;
  generating a custom power configuration for the one or more components based on the future usage context;
  utilizing a policy function component operating on the network to determine whether implementation of the custom power configuration on the mobile device would be consistent with Quality of Service (QoS) packet transfer requirements set by a network-operator; and
  implementing the custom power configuration on the mobile device by transmitting a message to the device to operate in accordance with the custom power configuration if it is determined that implementation of the custom power configuration on the mobile device would be consistent with the QoS requirements.

9. The apparatus of claim 8, wherein operations further comprise:
  analyzing historical usage of the mobile device.

10. The apparatus of claim 9, wherein operations further comprise:
  comparing the historical usage to current usage.

11. The apparatus of claim 9, wherein operations further comprise analyzing a calendar program residing on the mobile device.

12. The apparatus of claim 8, wherein operations comprising generating the custom power configuration comprise:
  selecting at least one of a hardware component and a software component on the mobile device to operate in a power off mode.

13. The apparatus of claim 8, wherein operations comprising generating the custom power configuration comprise:
  selecting a communication transceiver residing on the mobile device; and reducing a bandwidth setting of the communication transceiver.

14. The apparatus of claim 8, wherein operations comprising generating the custom power configuration comprise:
  reducing a power cycle at which at least one physical component of the mobile device operates.

15. A method comprising:
  utilizing machine learning to analyze component usage of a mobile device;
  predicting future component usage based on utilization of the machine learning;
  generating a custom power configuration for the mobile device based on predicted component usage;
  utilizing a policy function component operating on the network to determine whether implementation of the custom power configuration on the mobile device would be consistent with Quality of Service (QoS) packet transfer requirements set by a network-operator; and
  causing the mobile device to operate in accordance with the custom power configuration by transmitting a message to the mobile device to operate in accordance with the custom power configuration if it is determined that implementation of the custom power configuration on the mobile device would be consistent with the QoS requirements.

16. The method of claim 15, wherein the causing the mobile device to operate comprises:
  transmitting a message to the mobile device to reduce a bandwidth setting of a communication transceiver; and
  exchanging data with the mobile device through utilization of the communication transceiver.

17. The method of claim 15, where causing the mobile device to operate comprises:
  transmitting a command to the mobile device to power off at least one physical component of the mobile device.

18. The method of claim 15, wherein the one or more components comprise at least one of a hardware component and a software component.

19. The method of claim 15, wherein the machine learning analyzes at least one of a present behavior and a future behavior of the user.

20. The method of claim 15, wherein the at least one present behavior and future behavior comprises an activity that is disparate from data consumption of the mobile device.

* * * * *